Oct. 7, 1969 W. V. WERTHER ET AL 3,471,645
APPARATUS FOR MULTICHANNEL CARRIER-FREQUENCY
TELEPHONE TRANSMISSION
Filed Aug. 20, 1965 4 Sheets-Sheet 1

INVENTORS
Walter Von Werther
Friedrich Künemund
Hans Albsmeier
BY Spiel & Spiel
ATTYS.

Oct. 7, 1969 W. V. WERTHER ET AL 3,471,645

APPARATUS FOR MULTICHANNEL CARRIER-FREQUENCY TELEPHONE TRANSMISSION

Filed Aug. 20, 1965 4 Sheets-Sheet 2

INVENTORS
Walter Von Werther
Friedrich Kunemund
Hans Albsmeier

BY Hill & Hill ATTYS.

INVENTORS
Walter Von Werther
Friedrich Künemund
Hans Albsmeier
BY Spiess & Spiess ATTYS.

Oct. 7, 1969 W. V. WERTHER ET AL 3,471,645

APPARATUS FOR MULTICHANNEL CARRIER-FREQUENCY TELEPHONE TRANSMISSION

Filed Aug. 20, 1965 4 Sheets-Sheet 4

INVENTORS
Walter Von Werther
Friedrich Künemund
Hans Albsmeier
BY [signature] ATTYS.

United States Patent Office 3,471,645

Patented Oct. 7, 1969

3,471,645

APPARATUS FOR MULTICHANNEL CARRIER-FREQUENCY TELEPHONE TRANSMISSION

Walter V. Werther, Friedrich Künemund, and Hans Albsmeier, Munich, Germany, assignors to Siemens Aktiengesellschaft, a corporation of Germany Filed Aug. 20, 1965, Ser. No. 481,433
Claims priority, application Germany, Aug. 24, 1964, S 92,781
Int. Cl. H04j *1/18*
U.S. Cl. 179—15 4 Claims

ABSTRACT OF THE DISCLOSURE

A system for the carrier-frequency transmission of telephone messages which individual telephone channels are connected to modulators which are modulated by different frequencies and the output supply to mechanical filters which pass only one of the two side bands and in which the output of the filters is combined to form a pass band group.

Summary of the invention

Electromechanical resonators are disclosed which are capable of operating and filtering at low frequencies for use, for example, in carrier transmission of telephone systems. One embodiment of the invention discloses a plurality of generally rectangular-shaped resonators which are supported by a coupling wire that is mounted between a pair of tensioning devices and in which the electromechanical resonators are driven by electrostrictive means.

A variation of this modification comprises a pair of U-shaped supporting means with retaining wires extending from a base plate upon which bow means are mounted to mechanical resonators mounted side-by-side between the bows and the base plate. A transverse coupling wire is connected to the resonators and electrostrictive device means are attached to the end of the resonators to couple energy into and out of the filter thus formed.

Another embodiment of the electromechanical filter comprises a plurality of resonators mounted end-to-end with electrostrictive drive means mounted between the resonators and polarized so that upon the application of a suitable driving voltage the resonators will respond. A variation of this modification comprises a pair of mechanical filters so constructed and connected by a coupling bridge.

The invention relates to carrier-frequency telephone transmission making use of mechanical filters in the channel modulators.

The objects, as well as the apparatus employed to achieve such objects, will be explained in connection with the drawings, in which like reference characters indicate like or corresponding parts, wherein.

Figure 4:
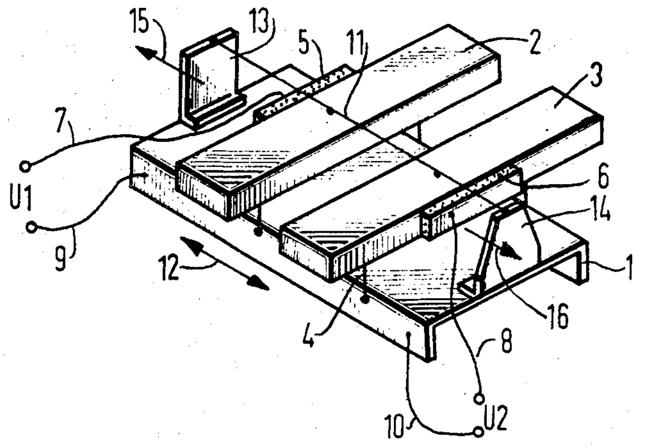
Figure 5:
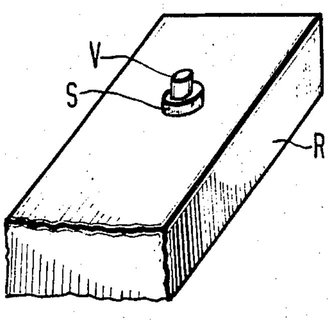
Figure 7:
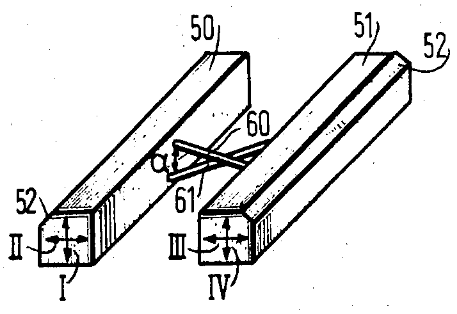
Figure 6:
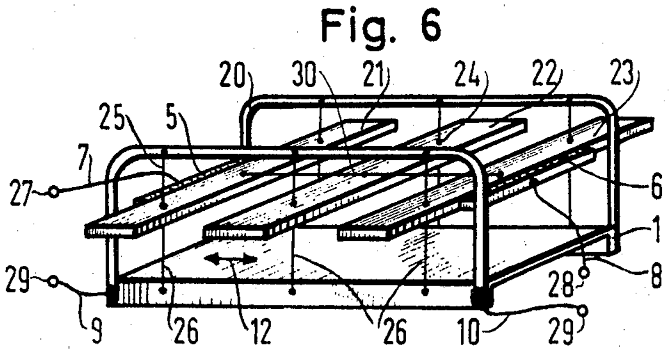
Figure 8:
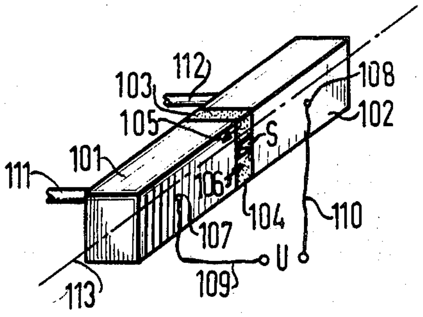
Figure 9:
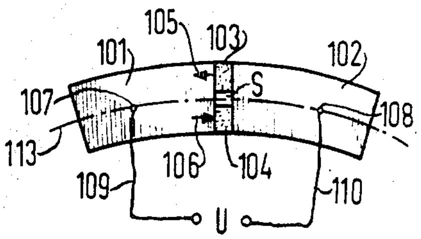
Figure 10:
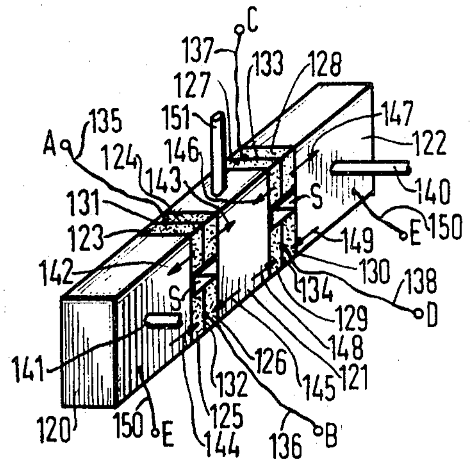
Figure 11:
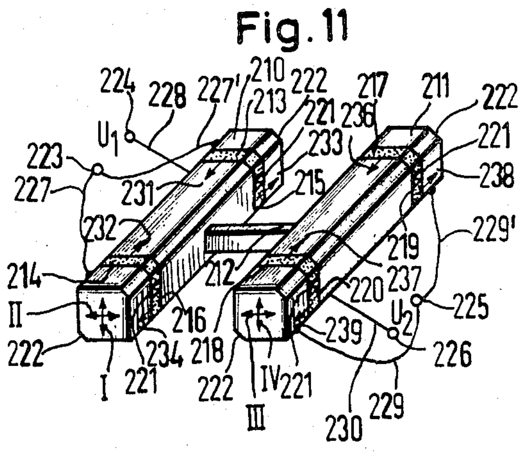
Figure 12:
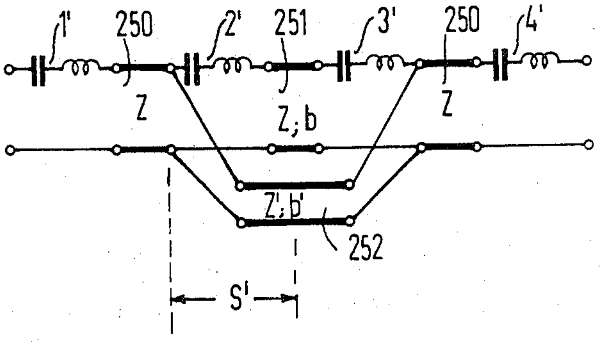

FIG. 4 schematically illustrates, in perspective, a mechanical channel filter according to the invention;

FIG. 5 schematically illustrates, in perspective, how a coupling element may be attached to a resonator;

FIG. 6 schematically illustrates, in perspective, a filter construction in which the resonator supporting wires also provide a mechanical bias;

FIG. 7 schematically illustrates, in perspective, a particularly efficient structure for coupling to resonators;

FIG. 8 schematically illustrates, in perspective a modified form of vibrator structure;

FIG. 9 is a side elevation of the structure of FIG. 8, illustrating the manner of bending thereof following application of an alternating voltage;

FIG. 10 schematically illustrates, in perspective, a further development of the invention, utilizing principles of the driving arrangement illustrated in FIGS. 8 and 9;

FIG. 11 schematically illustrates, in perspective, a further embodiment of the invention; and FIG. 12 is an electrical equivalent circuit diagram for the filter of FIG. 11.

Figure 1:
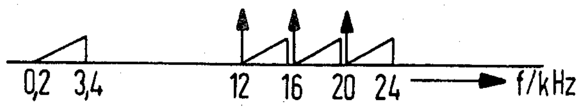
FIG. 1 is a diagram illustrating principles of carrier-frequency telephone transmission utilizing a preconversion of channel sub-groups.
Figure 2:
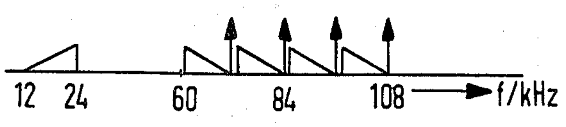
FIG. 2 is a similar diagram illustrating principles involved in a subsequent frequency conversion.
Figure 3:
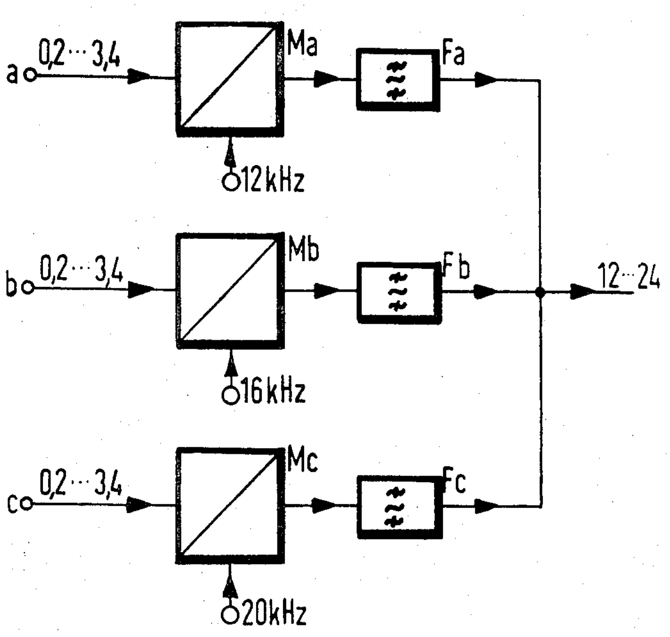
FIG. 3 is a diagram illustrating features of the subgroup conversion.

For the carrier-frequency transmission of telephone calls, as well known, the carrier frequency technique, according to the single side band principle, with the transmission bands utilizing one or more base groups containing one or more telephone channels, for which primarily two systems of group structure are known. The first of these systems operates according to the principle of premodulation, particularly in the form of a subgroup modulation. In this arrangement, as shown in FIG. 1, the transmission frequency bands provided for the individual telephone calls of 0.2 or 0.3 kc. lower limit frequency to about 3.4 kc. upper limit frequency are, by means of a separate subgroup conversion, converted to a frequency range of preferably 12 . . . 24 kc. Such subgroup is then connected by means of a further frequency conversion, according to single side band principles, to the position of the base group of 60 to 108 kc. As an example, in FIG. 2 the frequency scheme for a known system is schematically shown. The frequency conversion from the channel into the subgroup is carried out in the subgroup modulation, for example, according to the basic circuit diagram of FIG. 3, in which each of the telephone channels *a*, *b*, *c*, is separately connected with a respective modulator, M*a*, M*b*, M*c*, each of which receives the corresponding channel carrier, in the example 12 kc., 16 kc. and 20 kc. for frequency conversion. To the output of the individual modulator there is connected in each case a corresponding so-called channel filter F*a*, F*b*, F*c*, which passes only one of the two associated side bands arising in the amplitude modulation, illustrated in the diagram according to FIG. 1 as being that of the upper frequency range. Relatively high demands have to be made on such channel filters for the side band to be blocked must be suppressed by at least about 60 db. Likewise there is required, so far as possible, a distortion-free and uniform transmission attenuation for the pass range of the individual channel filters. There it has been additionally proved that for the individual filter the flank of the transition from the pass to the blocking range must, in each case, be especially steep adjacent the frequency of the side band to be blocked. Such channel filters have employed coils and capacitors, which is also true for the 2nd conversion, through which the subgroups are connected to the base group. The outputs of the channel filters of the subgroup are, as schematically indicated, grouped together.

The second of the two systems referred to involves the direction modulation, that is, the frequency band allocated to the channel is connected, by means of a signal frequency conversion per channel, directly to the group range of 60 to 108 kc. For this technique the use of quartz filters in the form of bridge circuits and the like has become general for filtering out the particular desired side band in the group range.

Recently, proposals have also been made to use mechanical filters instead of the quartz filters in such systems with direct modulation.

For the building up of groups in carrier frequency connections which extend over great distances and thereby must involve a great number of converter pairs, in particular for the connection of main exchanges of international and intercontinental lines, the demands on the quality of the individual transmission frequency band are very high. The efficient and stable distortion correction required of the individual transmission path presumes a high uniformity of the attenuation distortions, possibly also of transit time distortions, for which it heretofore has been thought that solution could be achieved according to the principle of direct modulation with high stability filters, such as quartz filters. Quartz filters make possible a frequency stability on the order of $10^{-5}$, while filters composed of coils and capacitors make it possible, at best, to reach values of about $10^{-3}$. Mechanical filters are appreciably better than filters utilizing coils and capacitors, but in general their stability decreases as the relative band width increases. Accordingly, for the use of mechanical filters in carrier frequency systems per se, the system of direct modulation into the base group is suggested, because the relative band width is here considerably smaller than for channel filters in the subgroup position.

On the other hand, to be able to utilize the well known advantages of subgroup modulation, mechanical filters with relative band widths between 20 and 30% are necessary which, in order to keep the running time distortions small, must have an attenuation characteristic curve which is steepened by attenuation poles. With the great band width required of the filters there heretofore resulted a relatively great time and thermal inconstancy and, through steepening of the attenuation characteristic, an increased tendency for the appearance of side waves which in the blocking range, lead to undesired attenuation breakthroughs and in the pass range to undesired attenuation and phase distortions. Mechanical channel filters for direct modulation have, however, the disadvantage that, as a result of the high frequency position, they must be produced with high precision with respect to the mechanical dimensions and the electrical tuning.

In a system for carrier-frequency telephone transmission making use of mechanical filters in the channel modulators these difficulties can be met, according to the invention, by the provision of a premodulation, in particular a subgroup modulation, and that the channel filters of these modulators are constructed as electromechanical filters, utilizing bending vibrators as resonators.

Coming under consideration, in particular, are bending vibrators which are coupled over at least one coupling member transmitting preferably only tension forces, such as a coupling wire which is connected to the individual vibrators in the zone of a vibration maximum. Further, it is proposed to provide the first and last bending vibrators in transmission direction with respective piezoelectric drives, preferably direct drives, each of which consists preferably of highly efficient ceramic material, such as lead ceramics. Especially of interest in this respect is a ceramic having lead-zirconate-titanate base, since this ceramic material combines a high transformation capacity with good time and thermal constancy. For a direct drive there has proved especially advantageous an arrangement on the individual bending vibrator in each case located in the central zone thereof; with the drive of the filters built in this manner, the difficulties mentioned with respect to the inconstancy can largely be eliminated.

As previously stated, mechanical filters involve the problem of side waves, especially in the case of relatively great band widths of the filters from about 20 to 30% and above all if the attenuation characteristic of the filter is steepened by attenuation poles. Surprisingly, however, in the form of bending vibrators a filter construction can be achieved in which the problem of side waves can be overcome, and in particular where steepened filters with great relative band widths are involved. More specifically, through the use of a coupling the degree of which is as high as possible in the zone of a vibration maximum of the individual bending vibrator, with simultaneous development of the coupling member in a manner whereby it has as little rigidity as possible, it is possible to practically elminate objectionable side waves.

In the arrangement according to the invention, the filters in the higher modulation stages, for example, to be used in the group modulators, even in the case of extremely high demands with respect to phase and attenuation distortions, may consist of coils and capacitors.

In the following, the invention is explained in detail with the aid of examples of construction, in which such explanations will relate only to the construction of the channel filters. Otherwise there is applicable the statements made with respect to FIGS. 1 to 3 for the construction of the telephone apparatus.

FIG. 4 shows schematically an especially simple form of a mechanical channel filter, in which two mechanical resonators 2 and 3 are supported by means of supporting wires 4. On the one the corresponding faces of the resonators remote from the oppositely disposed faces are applied respective electrostrictively acting excitation systems in the form blocks 5 and 6 consisting of electrostrictive material. The electrostrictive blocks 5 and 6 are each provided on the side remote from the reasonators with a metalizing, to which feed wires 7 and 8 are soldered, while feed wires 9 and 10 are connected directly with the metallic base plate 1. The two resonators 2 and 3 are coupled with one another over a coupling wire 11, which is attached to the respective antinodes of the resonators corresponding to the bending vibration. Upon application of an electrical alternating voltage to the terminals 7 and 9 the electrostrictive block 5 is expanded and contracted in the rhythm of the voltage U1. Over the so-called transverse contraction effect there is always excited a bending vibration in resonator 2 in the of the double arrow 12 when the frequency of the applied voltage U1 agrees with the bending frequency of the resonator 2. Over the coupling wire 11 serving as longitudinal coupler this bending vibration is transferred to the resonator 3, which thereby is likewise excited into bending vibration, and as a result thereof the electrostrictive block 6, applied ot the resonator 3, is subjected over the transverse contraction effect to contractions and expansions, whereby there arises between the metalization of the block 6 and the resonator 3 an electrical alternating voltage which can be obtained as output alternating voltage U2 between the terminals 8 and 10. The supporting wires 4 are attached to the resonators at the vibration nodes corresponding to the bending vibration, so that in the vibration process they are stressed in torsion.

In order to avoid the transmission of interfering side waves, the coupling wire 11 must, for example, be constructed so thin, that is, have a cross section which is so small, that it can no longer be fastened in tensioned form to the individual resonators, and thus can no longer transmit the push and pull components occurring in the coupling of the bending vibrations in the manner proper to the longitudinal coupler. For this reason the coupling wire is extended beyond the two resonators 2 and 3 and fastened to the two spring plates 13 and 14. The two spring plates 13 and 14 are so biased they endeavor to move in the direction of arrows 15 and 16, whereby the coupling wire 11 is mechanically biased, and as a result executes clean longitudinal vibrations. In the practical construction, the mechanical bias of the coupling wire can be simply achieved by a method in which the coupling wire 11 is first attached to the two resonators 2 and 3, for example, by soldering, and thereafter the spring plates 13 and 14, the flanged ends of which are attached to the base plate 1, are sprung in a direction opposite to that indicated by the arrows 15 and 16, following which the free ends of the coupling wire 11 are soldered to the spring plates. It thus is merely necessary to take care that the mechanical bias remains within the elasticity limit for the material used for the coupling wire 11, and at the same time the mechanical bias is greater than the maximally occurring pressure components occurring as a result of the bending vibrations in the coupling wire taking place in the coupling operation. Thereby the coupling wire 11, which for example, in the embodiment of FIG. 4, has a diameter of only 0.12 mm., remains in a satisfactorily tensioned condition, whereby pressure components are also suitably transmitted to the adjacently situated bending vibrators.

Instead of only one coupling wire, there can be used analogously also several coupling wires, for example, offset laterally with respect to the vibration maximum.

For the simple connection of the individual resonators through the coupling elements it is expedient to apply to the surfaces of the resonators facing the coupling elements small stud-like projections at the points of anchorage of the coupling elements. An especially simple method in this connection is shown in FIG. 5, in which there is represented separately a section of a resonator R. The projection V is formed by the stub of a retaining wire, which by means of spot welding is welded into the resonator in such a way that the collar S is firmly disposed on the resonator surface. For the practical production it is there expedient to provide the individual resonators first of all with retaining wires. Then the resonators R are placed on a level base plate and the ends of the wires remote from the resonator are brought to the same length in a single operation, as for example, by surface grinding, so that in the subsequent assembly of the filter the coupling elements lie in a common plane.

FIG. 6 illustrates an embodiment in which the retaining wires provided for the individual vibrators are simultaneously utilized for the generation of the mechanical bias necessary in the coupling wire. The two U-shaped bows 20 are secured on a metallic base plate 1, for example, by soldering. The three bending resonators 21, 22 and 23 are disposed between the base plate 1 and the sections of the bows 20 extending parallel to the base plate. In the vibration nodes 24, corresponding to the bending vibration, retaining wires 25 and 26 are so secured that the holding wires 25 extend from the U-shaped bows to the resonators and the retaining wires 26 extend from the resonators to the base plate 1. The individual resonators are coupled with one another over the continuous coupling wire 30 tensioned for push and pull operation. At the end resonators 21 and 23 are attached blocks 5 and 6 of electrostrictive material provided with a metalization. Attached to the metalization of the block 5 is a feed wire 7 which extends to a connecting terminal 27, and attached to the metalization of the block 6 is a feed wire 8 which extends to a connecting terminal 28. Additional terminal wires 9 and 10 are provided, which extend from the base plate 1 of the filter to the connecting terminals 29. The conversion of the electrical vibrations into mechanical vibrations or of mechanical vibrations into electrical vibrations takes place in the manner previously described in connection with the embodiment of FIG. 4. The vibration direction of the bending resonators 21 and 23 according to FIG. 6 is indicated by the double arrow 12. In the practical construction, expediently the individual resonators are initially fastened, in the required spacing for the desired coupler length, to the U-shaped bows and to the base plate. The coupling wire 30 is then soldered to the middle resonator 22. If the two outer resonators 21 and 23 are now shifted, for example by clamping devices, in the direction of the middle resonator, the retaining wires provided for the outer resonators are placed under greater tension. If in this state the coupling wire 39 is securely soldered to the end resonators, the retaining wires, following removal of the clamping devices, will return very nearly to their original positions, whereby the coupling wire 30 is simultaneously mechanically pre-tensioned or biased. Care must be taken that the mechanical bias lies within the elasticity limit for the material used for the couplng wire 30. For a simple production it is also expedient in the embodiment shown in FIG. 6 to provide the resonators, at the places to which the coupling wires and/or the retaining wires are attached, with a stub according to FIG. 5. In a construction according to FIG. 6 it is further to be regarded as advantageous that mechanical shocks are largely absorbed by the retaining wires 25 and 26 and, thus, are not transmitted to the resonators. Instead of the continuous coupling wire 30 there can also be used, in the same manner, individual coupling wires which are attached to the resonators between the limiting surfaces thereof extending in the vibration direction.

FIG. 7 illustrates an embodiment constructed with bending vibrators of a mechanical filter by means of which attenuation poles can be achieved on both sides of the pass range, in which system the position of the attenuation poles is freely selectable within relatively wide limits. In this example the resonators 50 and 51 are coupled with one another over coupling wires 60 and 61 crossing each other at the angle $\alpha$. The coupling wires, as illustrated in FIG. 7, lie in the vibration maximum of the resonators or they may also be slightly offset with respect to the vibration maximum in the longitudinal direction of the resonators. The electrostrictively acting transducer system for the conversion of the electrical vibrations into mechanical vibrations or for the conversion of the mechanical vibrations into electrical vibrations are, in the interest of clarity, omitted in the drawing, particularly since they will be explained in detail with respect to FIGS. 8 to 10. On the assumption that the resonators 50 and 51 of FIG. 7 are provided with electrostrictive converter systems according to FIGS. 8 to 10, the operation of the filter according to FIG. 7 may be explained as follows:

The resonator 50 is excited over the electrostrictive converters into bending vibrations in the direction of the double arrow I. Through the flattened portion 52, forming an asymmetry, the vibrations running in direction I additionally excite bending vibrations running in the direction of the double arrow II, the frequency of which as a result of the substantially square cross section of the resonators, agrees at least approximately with the frequency of the bending vibrations running in the direction of double arrow I. The vibration running in the direction of double arrow II is transmitted over the two coupling wires 60 and 61, to the resonator 51 and excites the latter bending vibrations in the direction of the double arrow III. In the coupling of the vibration modes II and III the coupling wires 60 and 61 are stressed in the rhythm of the vibration in dependence on $\alpha$, for both pull and push action respectively, and also for bending. (As the angle $\alpha$ becomes greater the bending coupling becomes stronger while the longitudinal coupling becomes weaker.)

Through the flattened portion 52 provided on the resonator 51, the latter is additionally excited into a bending vibration running in the direction of the double arrow IV, whose frequency agrees at least approximately with the frequency of the vibration running in direction III, and whose mechanical action is converted back into electrical vibrations with the aid of the electrostrictively acting transducer system.

Simultaneously, the coupling wires 60 and 61 are stressed, in dependence on angle $\alpha$, for bending and for push-pull through the vibration mode I, whereby the vibration mode I is coupled to the resonator 50 with the vibration mode IV on resonator 51. The vibration modes II and III are thereby skipped.

The electrical equivalent circuit diagram of a filter constructed according to FIG. 7 can be traced to an electric four-pole in one branch of which there are disposed four series resonance circuits which are tuned at least approximately to the same frequency and which are coupled with one another over transmission sections, while in the other branch there are located transmission lines between the individual coupling line sections. The four series resonance circuits correspond to the four vibration modes I to IV, the two outer line sections correspond to the flattened portions 52, while the inner line section corresponds to the coupling of the two vibration modes II and III over the coupling of the coupling elements 60 and 61. Additionally, the two inner resonance circuits are bridged over a further parallel-connection transmission section, which corresponds to the additional coupling of the vibration modes I and IV over the coupling elements 60 and 61. The position of the attenuation poles can be varied within wide limits through a change in the angle $\alpha$ at which the coupling wires 60 and 61 intersect. Further details of a filter constructed in this way, as well as further arrangements of mechanical filters with which attenuation poles can be generated will be subsequently explained with respect to FIGS. 11 and 12.

Resonators with rectangular cross section were utilized in the filters illustrated in FIGS. 4 to 6. In the same manner it also is possible to apply the concept of the invention to resonators with a cross section deviating from a rectangular form. Instead of a coupling wire or coupling wires, thin metal also can be used as coupling elements.

Through the use of biased coupling elements according to the invention there results a filter which is extremely poor in side waves, since the coupling elements have the greatest possible stiffness with respect to the desired longitudinal vibrations, while they have practically no rigidity at all with respect to other, undesired forms of vibration, such as, for example, bending or torsion vibration. For this reason vibrations, which possibly may be excited in the end resonator facing the filter input, having a vibration form deviating from the desired bending vibration, are, as a practical matter, not transmitted by the filter.

As previously mentioned, the direct drive of the bending vibrators which are utilized as transducers is of particular advantage. Examples thereof will be explained in detail with the aid of FIGS. 8 to 10.

In FIG. 8 there is illustrated a mechanical bending vibrator which consists of rectangular steel blocks 101 and 102, which are permanently connected with one another, for example by soldering, over the blocks 103 and 104 of an electrostrictive material. The electrostrictive material is here arranged in such a way in the cross section of the vibrator that between the blocks 103 and 104 along the neutral fiber 113 there remains a gap S. As electrostrictively active material there is advantageously used a lead ceramic (lead circonate), such as is known, for example, under the trade name PZT 6 of the Clevite firm. This ceramic material is especially well suited for this purpose because its Curie point lies above 300° C. and, thereby, a polarization impressed on the ceramic block through the soldering operation for the connection of the steel parts with the ceramic blocks is no longer presenting any problem. In order to assure a faultless soldering it is desirable to provide the ceramic blocks 103 and 104 on the side facing the steel parts with a silver coating, which can be applied in the usual manner, as for example, by vaporizing on in a vacuum. Such silver coatings then simultaneously serve as electrodes for the application of the polarization voltage to the ceramic blocks. The polarization impressed upon the ceramic blocks is assumed, in the vibrator represented in FIG. 8, as indicated by the arrows 105 and 106. In the vibration nodes 107 and 108 there are soldered thin connecting wires 109 and 110 for the supply of the alternating voltage U. Further, in the vibration nodes there are attached thin wires 111 and 112 which serve for the transfer of the bending vibration to further mechanical resonators or for the anchoring of the vibrator in a casing (not shown).

FIG. 9 is an elevational view in the longitudinal direction of the vibrator illustrated in FIG. 8, for the condition in which an alternating voltage U is applied to the steel parts 101 and 102 over the feed lines attached in the vibration nodes 107 and 108, the frequency of which voltage agrees at least approximately with the frequency of the vibrator. Corresponding to the polarization impressed on the electrostrictive blocks and indicated by the arrows 105 and 106, the block 103, lying above the neutral fiber 113 expands under the influence of the electrical field, while the block 104, lying below the neutral fiber, contracts under the influence of the electrical field. Thereby, the vibrator, as is indicated in FIG. 9, is bent according to the laws valid for the elastic line. When the polarity of the applied alternating voltage is reversed, the block 103 contracts while the block 104 expands, so that the vibrator bends in the opposite direction, which condition of vibration is not shown in FIG. 9. The vibrator thereby executes pronounced bending vibrations in the rhythm of the applied alternating voltage and, in particular, symmetrically to a plane established by the vibration nodes 107 and 108 (neutral fiber 113). In order to avoid the excitation of interfering vibrations, the ceramic blocks 103 and 104 are subdivided along the neutral fiber 113 in such a way that the gap S results. This measure is necessary for the reason that the forces acting in the direction of the bar axis are reversed in their sign. As is apparent from FIG. 9, the expansions and contractions of the electrostrictive blocks 103 and 104 agree with the direction of the push and pull forces occurring in the bending, so that the vibration excitation takes place over the so-called longitudinal piezo effect. Because of the association established by the Poisson number of the longitudinal expansion with the transverse contraction, through the utilization according to the invention of the longitudinal piezo effect there can be achieved, as compared to a comparable bending resonator excited over the transverse piezo effect, approximately three times greater electromechanical coupling factor, or, for the achievement of the same electromechanical coupling factor a smaller amount of electrostrictive material is required by about the square of the Poisson number, whereby there results a considerable improvement of the temperature constancy and of the quality of the bending resonator. Since the surface on which electrostrictive material and steel contact are considerably reduced as compared to a comparable bending resonator excited over the transverse effect, there also is reduced the interferring influence which the soldering layer exerts on the constancy of the vibrator. In a simple manner the electromechanical coupling factor can also be influenced by the feature that the ceramic blocks 103 and 104 are not arranged exactly at an angle of 90°, but at an angle deviating from this value.

As is well known, in electromechanical transducers the electromechanical coupling factor is a measure of the proportion of the electrical energy fed to the electromechanical transformer which is transformed into mechanical vibration energy. Physically viewed, this is the reason why there exists between the electromechanical coupling factor and the band width of an electromechanical transformer a direct relationship; that is, with a large electromechanical coupling factor, large utilizable band widths can be achieved. From this it follows that through the utilization of the longitudinal piezo-electric effect for the drive of a mechanical bending resonator it is possible to realize an electromechanical transducer which, with a relatively small constituent of electrostrictive material has a sufficient band width for all practical requirements.

A further development of a mechanical bending vibrator is shown in FIG. 10 in which use is made of the principle of the piezo-electric direct drive illustrated in FIGS. 8 and 9. A vibrator constructed in this manner can be used as an electric bipole and also as an electric four-pole. The bending vibrator consists of the steel parts 120, 121 and 122. Between the steel parts 120 and 121 there are soldered block 123, 124, 125 and 126, while between the steel parts 121 and 122 are disposed blocks 127, 128, 129 and 130 consisting of electrostrictive material. The electrostrictive blocks are so installed in the vibrator that along the neutral fiber there remains the gap S. Additionally, the electrostrictive blocks are subdivided by electrically conducting layers, especially silver layers, which lie perpendicular to the longitudinal axis of the vibrator, that is, between blocks 123 and 124 there is disposed the silver layer 131, between blocks 125 and 126 the silver layer 132, between blocks 127 and 128 the silver layer 133, and between blocks 129 and 130 the silver layer 134. From the silver layers separating the electrostrictive blocks there extend wire 135, 136, 137 and 138 connected respectively to the points A, B, C and D. In the vibration nodes there are attached the schematically indicated retaining wires 140 and 141, which may serve, for example, for the anchoring of the vibrator in a casing (not shown). On the individual electrostrictive blocks there is impressed a direct current preliminary treatment a prepolarization, such as is indicated, by way of example, by the arrows 142 and 149. The polarization is so selected that in each case blocks adjacent in longitudinal direction of the vibrator are polarized oppositely to one another, and that simultaneously the blocks lying on the one side of the neutral fiber are polarized oppositely to the blocks lying on the other side of the neutral fiber. Additionally, the three steel parts 120, 121 and 122 are conductively connected with one another by a connecting wire (not shown in detail), so that in the application of a voltage, the steel parts are at the same electric potential. From the steel parts there lead, in addition, the connecting wires 150 to the connection terminals E.

If the points A and B are electrically connected conductively with one another and to such connection there is applied one pole of an electrical alternating current source, while the other pole is placed on the terminal designated as E, there then arises between the silver layers 131, 132 and the steel parts 120, 121 an electrical alternating field which acts on the electrostrictive blocks 123 to 126. Under the influence of this electrical field, for example, the blocks 123 and 124 are expanded, while simultaneously the blocks 125 and 126, because of the oppositely directed prepolarization, are shortened. Thereby bending forces are exerted on the vibrator, so that it executes pronounced bending vibrations at its own frequency. By reason of these bending vibrations the blocks 146 to 149 also are subjected to expansions and contractions, whereby between the silver layers 133, 134 separating them and the steel parts 121, 122 there arises an electrical alternating voltage. If the points C and D are conductively connected with one another, then between this connection and the terminals E, the voltage arising between the silver layers 133 and 134, and the respective steel parts can be obtained as an alternating output voltage. In this system the bending vibrator acts as a frequency-selective electric four-pole, that is, as a band filter which is permeable only for the frequency corresponding to the inherent bending frequency of the vibrator.

In like manner, the vibrator described in FIG. 10 can also be used as an electric bipole, for example, when it is used as an end vibrator of a mechanical filter consisting of several mechanical resonators. In this case the points A, B, C and D are conductively connected with one another and between this connection and the terminals E the electrical alternating potential is applied. The coupling onto the next following mechanical resonator is there brought about with the aid of the coupling wire 151, which is attached to the vibrator in the zone of the vibration antinode corresponding to the bending vibration, to attain a strong mechanical coupling.

As already mentioned, in the following, with the aid of FIGS. 11 and 12, there will be explained in detail a mechanical filter constructed with bending resonators, in which through the simultaneous use of longitudinal and bending coupling in the coupling element, attenuation poles can be generated in the blocking range of the filter, whose distance from the pass range is freely selectable.

FIG. 11 illustrates the construction of a mechanical filter in which two mechanical resonators 210 and 211 are coupled with one another over a coupling bridge 212. The resonators 210 and 211 consist, in this particular example, of steel, but other materials with high mechanical quality also are utilizable, such as, for example, quartz glass. The resonators 210 and 211 are subdivided by the blocks 213, 214, 215, 216, 217, 218, 219 and 220 consisting of an electrostrictive material. The blocks 213 to 220 may consist of a lead ceramic, such as is known, for example, under the trade name PZT 6 of the Clevite firm. For the connection of the electrostrictive blocks 213 to 220 with the resonators 210 and 211, consisting of steel, there vaporized, for example, in a vacuum, onto the blocks 213 to 220, in a manner known per se, an electrically conducting coating, which is then solderable to the resonators which consist of steel. The electrostrictive blocks are so installed in the resonators that there remain the gaps 221 therebetween, which all lie in the middle planes of the resonators and extend parallel to one another. In this example of construction the resonators 210 and 211 have a square cross section, in which, in each case, two diagonally opposite corners are provided with flattened portions 222. To the outer parts of resonator 210 there lead, from a connecting terminal 22, two flexible feed wires 227 and 227' and to the middle part there leads, from a connecting terminal 224, a feed wire 228. In similar manner there lead to the outer parts of resonator 211, from a terminal 225, the two feed wires 229 and 229', and from a connecting terminal 226, there leads a feed wire 230 to the middle part. The feed wires 228 and 230 are so attached to the resonators that they stand at an angle at 45° to the upper or lower resonator boundary surface and, with a construction of sufficient strength they can be used for the purpose of anchoring the entire filter in a casing (not represented, for the sake of clarity).

The electrical operation of the mechanical filter represented in FIG. 11 can be explained as follows: If there is applied to the terminals 223 and 224 an input alternating voltage $U_1$, the electrostrictive blocks 213 and 214 are, for example, expanded in the one half-period of the alternating voltage $U_1$, since there is impressed on the block, through a direct current pretreatment, a polarization in the direction of the arrows 231 and 232. The blocks 215 and 216 are polarized, in the direction of arrows 233 and 234, oppositely to the blocks 213 and 214, so that in the same half-period of the input alternating potential $U_1$ they contract. When the polarity of the input alternating voltage $U_1$ is reversed, then correspondingly the blocks 215 and 216 are expanded, while the blocks 213 and 214 contract. In this manner the resonator 210 always executes pronounced bending vibrations in the direction of the double arrow I when its own resonance frequency agrees at least approximately with the frequency of the applied alternating potential $U_1$. Through the diagonally oppositely disposed flattened portions 22 the symmetry of the resonator 210 is disturbed. This disturbance has the consequence that simultaneously a bending vibration is excited in the resonator in the direction of the double arrow II, the frequency of which, because of the square cross section of the resonator, practically corresponds with the frequency of the bending vibration running in the direction of the double arrow I. The resonator 210, accordingly, executes two bending vibrations standing perpendicular to one another, which are coupled over the flattened portions 22. These two bending vibrations are transfered to the resonator 211 over the coupling bridge 212, which is secured to the resonators in the zone of a vibration antinode coresponding to the bending vibrations. For the vibration mode designated with II the coupling bridge 212 acts as longitudinal coupler, which, accordingly has the consequence that in the resonator there is excited a bending vibration running in the direction of the double arrow III. Since the resonator 211 is likewise provided with diagonally opposite flattened portions 222, in the same manner previously described, there is excited in resonator 211 a bending vibration perpendicular to the vibration direction III, which bending vibration runs in the direction of the double arrow IV. On the electrostrictive blocks 217 and 218 there is impressed an oppositely directed polarization in the direction of the arrows 236 and 237 and on blocks 219 and 220 there is impressed an oppositely directed polarization in the direction of the arrows 238 and 239. As in the resonator 210, in resonator 211 the blocks 217 and 218 disposed in the upper half of the resonator are polarized oppositely to the blocks 219 and 220 lying in the lower half. Through the blending vibrations running in the direction of the arrow IV, the electrostrictive platelets 217 and 218 accordingly are expanded, while simultaneously the blocks 219 and 220 are contracted. This condition is reversed in the following half-period of the bending vibration, so that between the outer parts and the middle part of the resonator 211 there arises an alternating potential which can be obtained as output alternating voltage $U_2$ over the feed wires 229, 229', and 230 at the terminals 225 and 226.

The coupling bridge 212 in addition to acting as a longitudinal coupler, also simultaneously acts as a bending coupler, which additionally couples on resonator 210 the vibration mode running in the direction of the double arrow I with the vibration mode on resonator 211 running in the direction of the double arrow IV. In this manner there results an additional coupling between the vibration modes I and IV, in which the vibration mode II and the vibration mode III generated by the longitudinal coupling are skipped. This additional coupling of the two resonators 210 and 211 over the bending coupling of the coupling bridge 212 yields two attenuation poles in the attenuation characteristic of the filter, of which the one lies below and the other above the pass range of the filter.

FIG. 12 illustrates the equivalent electrical circuit diagram of a mechanical filter constructed according to FIG. 11. To the vibration modes I and IV there correspond four series resonance circuits 1'' to 4'', which are coupled with one another over transmission elements 250 and 251. The transmission elements 250 here correspond to the flattened portions 222 and can be conceived as a transmission line with the wave impedance Z and the phase angle of 90°. The transmission section 251 represents the coupling of the two resonators over the longitudinal coupling and should have the wave impedance Z and the phase angle *b*. The transmission section 252 connected in parallel with the resonance circuits 2' and 3', and to the coupling line 51 represents the additional coupling over the bending coupling of the coupling bridge and has the wave impedance Z' and the phase angle *b'*.

The development of the attenuation poles can be mathematically proved by setting up the four-pole equations of the filter section designated by S in FIG. 12. This filter section presents a filter half-member, which consists of the resonance circuit 2', and the half transmission section 251 (wave impedance Z; phase $b/2$), to which there is connected in parallel the half transmission section 252 (wave impedance Z'; phase $b'2$). The attenuation poles of a symmetrical four-pole lie, as is well known, at the frequencies for which the difference of short circuit and idling resistance $W_K(WVK-W_L)$ of the half four-pole is zero. If one assumes, merely for simplification of the calculation, for the phase *b* angle of 90°, then the calculation yields a distance $B_\infty$ of the attenuation poles with reference to a reference band B.

$$\frac{B_\infty}{B}\approx\frac{1}{2}\sqrt{1+\frac{Z'}{Z}\sin b'} \qquad (1)$$

If the phase *b'* of the transmission element 252 is at 90°, and, on the other hand, the phase angle of the selected transmission element 251 deviates from 90°, there then results for the distance B of the attenuation and poles the relation represented in Equation 2, when simultaneously for the wave impedance Z and Z' the Formulas 1 containing the cross section dimensions of the coupling bridge 212:

$$\frac{B_\infty}{B}\approx\frac{1}{2}\cdot\sqrt{1+\frac{1}{\sqrt{2}\sin b}\cdot\sqrt{\frac{v}{\omega_0}}\cdot\sqrt[4]{\frac{Q}{M}}} \qquad (2)$$

In Equation 2 *v* designates the velocity of sound for the material used for the coupling bridge $\omega_0=2\pi f$ with $f_0$ as band middle frequency of the filter, Q the cross sectional area of the coupling bridge and M the surface moment of inertia in the direction of the bending vibration of the coupling bridge.

In analogous manner, it is possible to use, instead of a coupling bridge with rectangular cross section, also a coupling bridge with circular cross section. If here the coupling bridge has the diameter D, there then results for the separation distance $B_\infty$ of the attenuation poles for a reference width B, the value apparent form Equation 3

$$\frac{B_\infty}{B}\approx\frac{1}{2}\cdot\sqrt{1+\frac{1}{\sin b}\cdot\sqrt{\frac{2v}{\omega_0 D}}} \qquad (3)$$

In Equations 1 to 3 the reference band width B is equal to the width of vibration circuit 2' in FIG. 12 with reference to the frequency $f_0$ and the wave resistance Z of a 90° coupling conduit 251.

In Equations 1 and 3 it is assumed that the phases *b* and *b'* fall in 180° ranges which generate attenuation poles at real frequencies. If one of the thus established phases *b* or *b'* is displaced by the addition of a phase of, for example, 180°, in intermediate ranges likewise of 180° attenuation poles then result at imaginary frequencies. This position of the attenuation poles can be utilized in a manner known per se for the influencing of the phase angle.

Generally speaking, through the double utilization of the resonators and of the coupling bridge there can thus be constructed an *n*-circulated filter with only $n/2$ resonators, in which $2(n/2-1)$ attenuation poles are achievable. In mechaincal filters there frequently arise attenuation interruptions or breakthroughs in the blocking range and distortions of the attenuation behavior in the pass range, in addition to the types of vibration possible in the individual resonators, also through another type of vibrations which are evoked by individual resonances of the entire vibration system of a mechanical filter. The number of these inherent resonances becomes greater as the number of resonators is increased. If, therefore, it is possible to fulfill a given attenuation condition with as small as possible a number of resonators, as is done for example according to the invention through the double utilization of the resonators, a filter which is extremely poor in side waves is achieved. The demand for freedom from side waves is further met by the fact that side vibrations which may arise, for example, through manufacturing tolerances in the resonators, are included, through a deliberately produced asymmetry, in the overall behavior of the filter. To this is added the feature that the longitudinal coupling of the bending resonators is especially effective with respect to the coupling degree, so that in wide-band filters there also result coupling bridges of low rigidity, which again counteracts the arising of side waves. A further advantage of the system according to the invention is also to be seen in the small spatial extension which as already mentioned, acts against the arising of side waves and makes possible the extraordinarily compact and space-saving construction of the whole filter.

From the above discussions and calculation formulae it will be appreciated that in a mechanical filter constructed according to FIG. 11 the separation distance of the attenuation poles appearing symmetrically at both sides of the filter pass range is, within wide limits, freely selectable and is adjustable primarily by the extent or strength of the bending coupling occurring in the coupling element.

The band width of the filter is essentially determined by the strength of the longitudinal coupling. Disregarding the resonator dimensions, the material constant and the length of the coupling element, the longitudinal coupling is determined by the cross section Q, that is by the product $A=a \cdot h$, while the extent or strength of the bending coupling is determined by the surface inertia moment $M=ah3/12$, wherein $a$ is the thickness and $h$ the height of a rectangular coupling element. (Analogous considerations also hold for coupling elements which have a cross section different from a rectangular form.) From this it follows that simultaneously the filter band width and the distance of the attenuation poles from the filter pass range are freely selectable merely through a corresponding dimensioning of the coupling element.

The example of FIG. 7 can also be traced back to the electrical equivalent circuit diagram according to FIG. 12. In the example of FIG. 7 instead of merely a single coupling element, two coupling wires crossed with respect to one another are utilized, whereby through the selection of the crossing angle $\alpha$ a further degree of freedom is given in the choice of the geometric dimensions of the coupling wires. Such forms of construction are always expedient when the attenuation poles must lie relatively close to the filter pass range, namely when the separation distance of the attenuation poles is only slightly greater (for example, up to 10%) than the filter pass range.

Changes may be made within the scope and spirit of the appended claims which define what is believed to be new and desired to have protected by Letters Patent.

We claim:

1. An arrangement for carrier-frequency telephone transmission comprising means for forming a plurality of telephone channels which lie in the frequency range between 0.2 to 3.4 kHz. into a pregroup, means for converting the pregroup through a frequency conversion into a base group whose frequency is higher than the frequency of the pregroup, a plurality of modulators each receiving the individual telephone channels, each modulator receiving carrier frequencies of different frequency values amplitude modulated with a particular telephone channel in each modulator, a plurality of filters respectively connected to the plurality of modulators, each filter having a pass band such that one of the two side bands from the modulator is passed, each of the filters being tuned so that side bands on the same side of the carrier frequencies are passed, the filters comprising mechanical filters which consist of several mechanical resonators that operate in bending oscillation, the individual bending resonators of the mechanical filters in each case being coupled to one another, at least one coupling element coupling said bending resonators and operating in the longitudinal mode said coupling elements connected to the bending resonators in the zone of oscillation of an oscillation maximum occurring with respect to bending oscillations, and electrostrictive input and output means connected to the first and last mechanical bending resonator in each of said mechanical filters.

2. Apparatus according to claim 1 wherein the first and last mechanical bending resonators in the transmission direction are each provided with a piezoelectric direct drive, especially of lead ceramic material.

3. Apparatus according to claim 2 wherein the piezoelectric direct drive is arranged in each case in the central zone of the bending resonator.

4. Apparatus according to claim 1 wherein at least two flexure resonators are provided with asymmetry for the generation of bending vibrations of at least approximately like frequency standing perpendicular to one another and connected by a coupling element attached in the zone of a vibration maximum, which coupling element transmits a longitudinal and a bending coupling for the generation of attenuation poles, the cross sectional dimensions of the coupling element being such that the longitudinal coupling largely determines the band width of the filter and the bending coupling largely determines the separation distance of the attenuation poles.

References Cited

UNITED STATES PATENTS

| | | | |
|---|---|---|---|
| 2,717,361 | 9/1955 | Doelz | 333—71 |
| 2,835,889 | 5/1958 | Dyer et al. | 343—200 |
| 2,981,905 | 4/1961 | Mason | 333—71 |
| 3,004,176 | 10/1961 | Mason | 333—71 X |
| 3,135,933 | 6/1964 | Johnson | 333—71 |
| 3,342,941 | 9/1967 | Kondo | 179—15 |
| 3,296,561 | 1/1967 | Polucci | 333—72 X |
| 3,354,413 | 11/1967 | Ko | 333—72 |
| 3,015,789 | 1/1962 | Honda | 333—72 |
| 2,571,019 | 10/1951 | Donley. | |
| 2,501,488 | 3/1950 | Adler. | |
| 3,146,415 | 8/1964 | Albsmeier | 333—72 |

RALPH D. BLAKESLEE, Primary Examiner

U.S. Cl. X.R.

333—71, 72; 343—200